May 2, 1939. C. R. PAYNE ET AL 2,156,604
PIPE JOINT
Filed Oct. 16, 1937
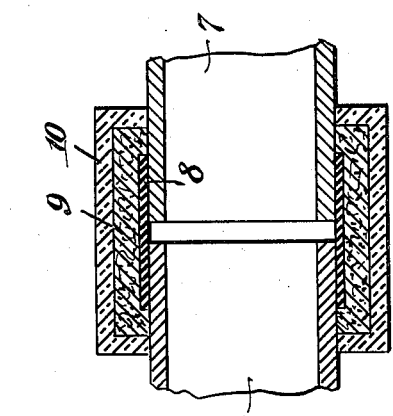
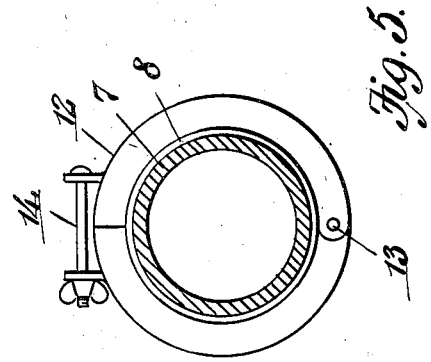
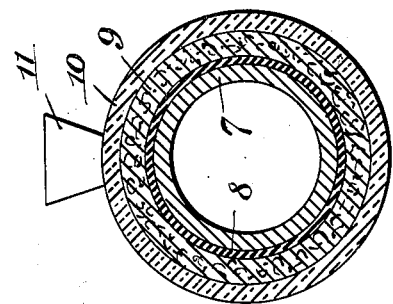
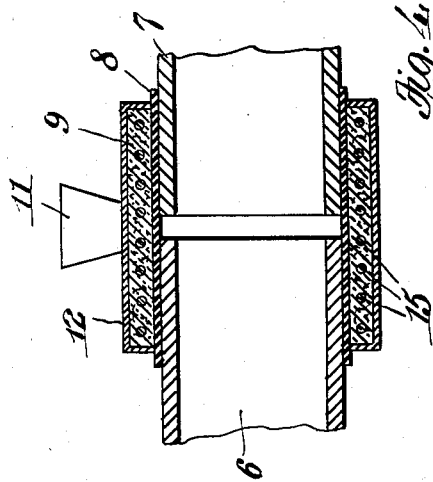
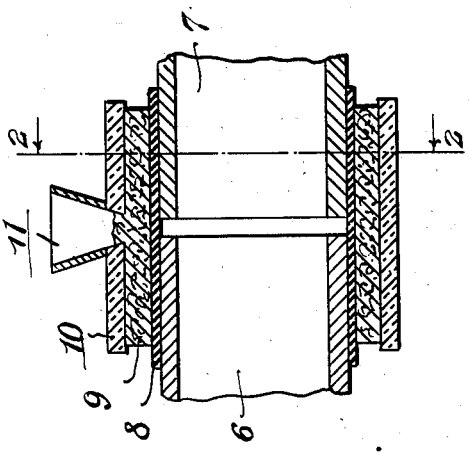
Inventors
Clarion R. Payne and
George L. Writz
By Dwight R. Fair
Attorney Patented May 2, 1939

2,156,604

UNITED STATES PATENT OFFICE 2,156,604

PIPE JOINT

Claron R. Payne, Allentown, and George L. Wirtz, Monterey, Pa., assignors to The Atlas Mineral Products Company, Mertztown, Pa., a corporation of Pennsylvania Application October 16, 1937, Serial No. 169,480

2 Claims. (Cl. 285—114)

This invention relates generally to pipe joints.

The method at present employed in connecting pipe ends, includes packing or filling the annular space between the bell and spigot with a "hot pour" material such as asphalt, sulphur cement or other compounds, and while numerous efforts at a perfectly sealed joint of this character have been attempted, none have proved entirely satisfactory. This is due primarily to the fact that shrinkage or contraction of the bonding material occurs after it has solidified in the joint, which results in a void or space between the jointing material and the adjacent pipe surface. In "hot pour" compounds the amount of shrinkage in the solid state is dependent upon the physical properties of the particular compound employed as the bonding agent. When concrete, silicate cements and other cold mortars are employed, shrinkage occurs due to loss of water in "setting up". The presence of voids thus produced tends to a defective or leaky joint, and permits of plant or tree roots gaining access to the interior of the pipe with very undesirable results.

While it has not been possible heretofore to find material or a mixture of materials as bonding agents which are entirely free of shrinkage upon cooling in the solid state, mixtures of sulphur base compounds have proven desirable because of certain properties or characteristics possessed by them and suited to the union of pipes in underground systems. Such mixtures are employed because of the facility with which they may be handled, the permanence of the bond when set, and particularly because they are possessed of root repellent properties. However, a disadvantage in the employment of materials including sulphur base compound is the rigidity or inflexibility of the completed joint.

An ideal pipe joint is one which is so made as to eliminate the possibility of leakage due to contraction of the bonding compound, one which will be possessed of root repellent characteristics such as afforded by a sulphur base cement, a joint which is strong and permanent and yet which will possess sufficient flexibility as to be adaptable to practically any type of pipe line construction, and one wherein the danger of infiltration is eliminated. It is the object of the present invention to provide a pipe joint possessing these characteristics and which will prove thoroughly practical and efficient in use.

In the drawing:

Figure 1 is a longitudinal sectional view taken through adjoining pipe ends and illustrating our improved method and construction of joining and sealing such ends, Figure 2 is a transverse sectional view taken substantially upon line 2—2 of Figure 1, Figure 3 is a view similar to Figure 1 and illustrating a slightly modified form of the invention, Figure 4 is a view similar to Figure 1 and disclosing a further modification, and Figure 5 is a sectional view through a pipe section and illustrating in elevation an improved form which may be used in carrying forth the invention.

Referring now to the drawing, the ends of the pipe sections to be joined are indicated at 6 and 7, respectively. The pipe may be of the kind ordinarily employed in fluid conduit construction and may be formed of terra cotta, cement or other composition material, or may be constructed of cast iron or steel, as desired. The pipe sections are perfectly plain or straight and therefore eliminate the disadvantages present in the commonly used bell and spigot pipe.

The pipe ends thus aligned are enclosed by a sleeve of flexible moistureproof material indicated at 8, and it is preferred that this sleeve be made relatively long so as to extend back a substantial distance from the extremities of the pipe, and also snugly engage the outer surfaces of the latter. In the preferred form of the invention, this sleeve will be formed of rubber of proper thickness, but it will be understood that the sleeve need not be limited to rubber, as asphalt or rubber impregnated cloth, cardboard, fiber board, or other suitable composition materials, rendered moistureproof, possessing a proper degree of flexibility and compression, may be employed with highly satisfactory results. Obviously, the connection of the pipe ends by a sleeve of this character permits of movement of the pipe ends relative to one another to a substantial degree without impairing the sleeve.

The pipe ends thus connected are enclosed by a bonding agent of the desired materials, such as sulphur cement, or other materials possessing the required or desired characteristics, the bonding material being applied relatively thick. The bonding agent here disclosed is indicated at 9, and is maintained in proper body depth throughout the circumference of the joint by a collar or form indicated at 10. This collar may be made of refractory material, terra cotta, concrete or metal, and is maintained concentric with the pipe ends in any approved manner. The bonding material may be poured into the annular space thus provided between the sleeve and the collar through a suitable opening at one side of the latter by means of the pouring cone 11 in the usual manner. If desired, however, the bonding material may be introduced to the space at the ends of the collar, as will be readily understood.

The collar 10 may remain in position as a part of the joint, if desired, or may be removed after the bonding material has become firm.

By building up the joint in this manner, it is apparent that a liberal degree of flexibility of the joint is provided, due to the characteristics of the flexible sleeve connecting the pipe ends. When the bonding material has cooled or becomes set, the contraction thereof in this change of temperature firmly compresses the sleeve 8 upon the pipe ends and thus insures a moisture-proof joint. The contractile properties of the bonding material heretofore found objectionable are thus utilized to advantage in effecting a perfect and permanent seal of the joint. As the sleeve and bonding agent are formed of root repellent material, it is obvious that a joint possessing highly desirable qualities is thus provided. Notwithstanding that the bonding agent rigidly secures the pipe ends together, the flexible properties of the sleeve are always present, thus lending a certain degree of flexibility to the pipe union. It is moreover apparent that a joint of this character is secure against any possibility of infiltration.

In Figure 3 of the drawing there is illustrated a modification, and in which the bonding material surrounds the sleeve and also projects over the ends thereof. In this form of the invention, the joint is substantially inflexible due to the entire enclosure of the connecting sleeve. The collar 10 is provided at its ends with inwardly projecting flanges to engage with the pipe ends, and these flanges are arranged so as to be disposed slightly beyond the extremities of the sleeve 8. The flanges thus serve to properly center the collar upon the pipe ends and also provide dams for the fluid bonding material 9.

It may be preferred to remove the collar after the bonding material has become set, in which event a metallic form such as shown in Figures 4 and 5 may be used. This form indicated at 12, may be made of arcuate metal sections hinged together as at 13 so as to be readily applied to and removed from the pipe ends. The form thus provided will be adjusted to the joint over the sleeve 8 and may be held assembled thereon by a connecting pin or bolt 14 as shown in Figure 5. This form will be filled through the cup 11 in the usual manner and will remain in position until the bonding material has become firmly set, after which it may be readily removed. It may also be desired to reinforce the bonding material, in which event metallic strands 15 may be arranged within the form prior to the pouring operation, or, if preferred, suitable reinforcing metallic fabric may be used instead of the strands 15.

It is apparent from the foregoing that the method of connecting the pipe ends here disclosed insures a permanent seal against egress or ingress of fluid, renders the joint proof against tree or plant roots gaining access thereto, and permits of flexibility in the pipe line within proper limits. The adaptation of the joint to straight and smooth end pipes permits of the use of pipe of inexpensive construction, which may be easily handled and at the same time insuring an effective and permanent joint. The mixture here proposed as a bonding agent is a molten substance, but it will be understood that the invention is not to be restricted to such materials as it is obvious that a cold mix or a cementitious substance may be employed with equal success.

Having thus described our invention, what we claim as new and useful is:

1. In a pipe joint, the combination with the ends of pipe sections, of a sleeve of relatively heavy rubber enclosing and connecting said ends to seal the joint thereof against leakage and to permit a degree of flexibility in the joint, said sleeve possessing a substantial degree of compressibility, and a ring of bonding material embracing said sleeve and containing root repellent ingredients, said material possessing the characteristics of contracting when becoming set to compress said sleeve tightly upon said pipe sections.

2. In a pipe joint, the combination with the ends of pipe sections, of a sleeve of relatively heavy rubber enclosing and connecting said ends to seal the joint thereof against leakage and to permit a degree of flexibility in the joint, said sleeve possessing a substantial degree of compressibility, and a ring of bonding material embracing said sleeve and consisting of a root repellent sulphur base cement, said material possessing the characteristics of contracting when becoming set to compress said sleeve tightly upon said pipe sections.

CLARON R. PAYNE.
GEORGE L. WIRTZ.